(12) United States Patent
Seno et al.

(10) Patent No.: US 8,596,032 B2
(45) Date of Patent: Dec. 3, 2013

(54) CORE-SHEATH TYPE CONJUGATED YARN, KNITTED FABRIC, CLOTHING PRODUCT, AND METHOD OF PRODUCING CORE-SHEATH TYPE CONJUGATED YARN

(75) Inventors: Shigeaki Seno, Tokushima (JP); Akira Kudo, Tokushima (JP)

(73) Assignee: Nisshinbo Textile, Inc., Tokyo (JP)

( * ) Notice: Subject to any disclaimer, the term of this patent is extended or adjusted under 35 U.S.C. 154(b) by 105 days.

(21) Appl. No.: 13/318,325

(22) PCT Filed: Jun. 15, 2010

(86) PCT No.: PCT/JP2010/060077
§ 371 (c)(1),
(2), (4) Date: Oct. 31, 2011

(87) PCT Pub. No.: WO2011/052262
PCT Pub. Date: May 5, 2011

(65) Prior Publication Data
US 2012/0036899 A1   Feb. 16, 2012

(30) Foreign Application Priority Data
Oct. 28, 2009 (JP) ................. 2009-247400

(51) Int. Cl.
*D02G 3/02*  (2006.01)
*D02G 3/36*  (2006.01)

(52) U.S. Cl.
USPC ............................. 57/210; 57/225

(58) Field of Classification Search
USPC ............... 57/200, 210, 225; 428/373
See application file for complete search history.

(56) References Cited

U.S. PATENT DOCUMENTS

| | | | |
|---|---|---|---|
| 4,086,214 A * | 4/1978 | Cardy | ............... 528/52 |
| 5,171,633 A | 12/1992 | Muramoto et al. | |
| 2009/0269582 A1 * | 10/2009 | Hiraishi et al. | ............... 428/373 |
| 2009/0305037 A1 | 12/2009 | Tsukada et al. | |

FOREIGN PATENT DOCUMENTS

| | | |
|---|---|---|
| EP | 0 349 313 A2 | 1/1990 |
| GB | 1 507 146 A | 4/1978 |
| JP | 56-085611 A | 7/1981 |
| JP | 2698475 B2 | 4/1991 |
| JP | 2002-115119 A | 4/2002 |
| JP | 2007-077556 A | 3/2007 |
| JP | 2009-228156 A | 10/2009 |
| JP | 2009-235618 A | 10/2009 |

OTHER PUBLICATIONS

International Search Report of PCT/JP2010/060077, date of mailing Sep. 21, 2010.
Supplementary European Search Report, EP 10826397.1, dated Jun. 29, 2012, 4 pages.

* cited by examiner

*Primary Examiner* — Shaun R Hurley
(74) *Attorney, Agent, or Firm* — Hamilton, Brook, Smith & Reynolds, P.C.

(57) ABSTRACT

In an embodiment, a core-sheath type conjugated yarn includes a core portion containing a double-prepolymer type polyurethane and a sheath portion containing an elastomer. The double-prepolymer comprises a prepolymer having terminal isocyanate groups obtained from reacting a polyol and a diisocyanate, and a prepolymer having terminal hydroxyl groups obtained from reacting a polyol, a diisocyanate, and a low-molecular weight diol. In other embodiments, a method of producing the core-sheath type conjugated yarn using conjugate spinning conditions provides a conjugated yarn with a fineness of 18 to 110 dtex, a weight ratio of the core portion to the sheath portion of 95/5 to 60/40, and a drawing ratio of 1.5 to 4.0.

7 Claims, No Drawings

CORE-SHEATH TYPE CONJUGATED YARN, KNITTED FABRIC, CLOTHING PRODUCT, AND METHOD OF PRODUCING CORE-SHEATH TYPE CONJUGATED YARN

This application is the U.S. National Stage of International Application No. PCT/JP2010/060077, filed Jun. 15, 2010, which designates the U.S., published in Japanese, and claims priority under 35 U.S.C. §§119 or 365(c) to Japan Application No. 2009-247400, filed Oct. 28, 2009.

TECHNICAL FIELD

The present invention relates to a core-sheath type conjugated yarn, a knitted fabric, a clothing product, and a method of producing a core-sheath type conjugated yarn.

BACKGROUND ART

Yarns each having stretchability have been adopted as yarns for use in leg knitted fabric products such as stockings. Polyurethane elastic fibers obtained by dissolving a general-purpose polyurethane in a solvent and spinning the solution have been known as such yarns each having stretchability. However, the polyurethane elastic fibers are not used alone in products, and are generally used as a mixture with long fibers or various short fibers made of, for example, nylon and polyester. For example, composite yarns obtained by covering the polyurethane elastic fibers, such as filament-twisted yarns (FTY's) including a single-covered yarn (SCY) and a double-covered yarn (DCY) have been known. However, each of the FTY's has such a drawback as to be poor in transparency because of its bulkiness due to the covering of a core yarn with a front yarn.

Conjugated yarns have been known as yarns each having stretchability and superior in transparency to an FTY (Patent Document 1), and leg knitted fabric products produced from knitted fabrics using the conjugated yarns have been hitting the market. The conjugated yarns are composite yarns spun by using various kinds of resin components. The leg knitted fabric products produced from the knitted fabrics using the conjugated yarns are superior in transparency to leg knitted fabric products produced from knitted fabrics using covering yarns.

However, the conventional conjugated yarns are generally poor in strength and stretchability. In view of the foregoing, each of the conventional conjugated yarns has expressed its strength and stretchability by stretching a complete yarn under heat to provide a crimp.

However, the tenacity of a gray yarn itself reduces owing to heat setting, though an apparent strength increases by virtue of a reduction in gray yarn fineness resulting from the stretching. In addition, the tactile senses of leg knitted fabric products produced from knitted fabrics using yarns provided with crimps are impaired by the presence of the crimps.

Conjugated yarns each using a cross-linked resin obtained by adding polyisocyanate to a general-purpose polyurethane in its core portion have been reported as conjugated yarns each having excellent stretching elasticity (Patent Document 2). The polyurethane obtained by the method has good stretchability but has an insufficient power feeling, and hence involves the following problems when turned into a knitted fabric. The knitted fabric is poor in wearing feeling and durability.

Conjugated yarns spun by using a general-purpose polyurethane and a polyester-based elastomer have been reported as recent conjugated yarns (Patent Document 3). The melting viscosity of each of the general-purpose polyurethane and the polyester-based elastomer must be appropriately adjusted upon conjugation. In particular, when the general-purpose polyurethane is made comparable in melting viscosity to the polyester-based elastomer, part of the polyurethane thermally decomposes, and hence problems in terms of spinnability and the physical properties (e.g., stretchability) of the resultant yarns, such as a discharge failure and a reduction in degree of symmetry, may arise.

CITATION LIST

Patent Document

[Patent Document 1] JP 56-85611 A
[Patent Document 2] JP 2698475 B2
[Patent Document 3] JP 2007-77556 A

SUMMARY OF INVENTION

Technical Problem

An object of the present invention is to provide a novel conjugated yarn which: has excellent stretchability; is provided with a sufficient strength; shows high transparency; provides a good tactile sense; and has moderate fit power. Another object of the preset invention is to provide a knitted fabric knitted by using such conjugated yarn and a clothing product using such knitted fabric. Still another object of the present invention is to provide a method of producing a novel conjugated yarn which: has excellent stretchability; is provided with a sufficient strength; shows high transparency; provides a good tactile sense; and has moderate fit power.

Solution to Problem

A core-sheath type conjugated yarn of the present invention is a core-sheath type conjugated yarn, including: a core portion containing a polyurethane; and a sheath portion containing an elastomer, in which: the polyurethane includes a double-prepolymer type polyurethane obtained by causing a prepolymer having isocyanate groups at both terminals, which is obtained by causing a polyol and a diisocyanate to react with each other, and a prepolymer having hydroxyl groups at both terminals, which is obtained by causing a polyol, a diisocyanate, and a low-molecular weight diol to react with one another, to react with each other; and the core-sheath type conjugated yarn is obtained by conjugate spinning under conditions of a fineness of 18 to 110 dtex, a weight ratio of the core portion to the sheath portion of 95/5 to 60/40, and a drawing ratio of 1.5 to 4.0.

In a preferred embodiment, the above-mentioned elastomer includes at least one kind selected from polyester-based elastomers and polyamide-based elastomers.

According to another aspect of the present invention, there is provided a knitted fabric. The knitted fabric is knitted by using the core-sheath type conjugated yarn of the present invention.

In a preferred embodiment, the above-mentioned knitted fabric is used in a leg knitted fabric product.

According to another aspect of the present invention, there is provided a clothing product. The clothing product uses the knitted fabric of the present invention.

According to another aspect of the present invention, there is provided a method of producing a core-sheath type conjugated yarn. The production method of the present invention is a method of producing a core-sheath type conjugated yarn having a core portion containing a polyurethane and a sheath portion containing an elastomer, the method including subjecting a resin containing the polyurethane and a resin containing the elastomer to conjugate spinning, in which: the polyurethane is obtained by causing a prepolymer having isocyanate groups at both terminals, which is obtained by causing a polyol and a diisocyanate to react with each other, and a prepolymer having hydroxyl groups at both terminals, which is obtained by causing a polyol, a diisocyanate, and a low-molecular weight diol to react with one another, to react with each other; and the conjugate spinning is performed under conditions of a fineness of 18 to 110 dtex, a weight ratio of the core portion to the sheath portion of 95/5 to 60/40, and a drawing ratio of 1.5 to 4.0.

In a preferred embodiment, the above-mentioned elastomer includes at least one kind selected from polyester-based elastomers and polyamide-based elastomers.

Advantageous Effects of Invention

According to the present invention, there can be provided a novel conjugated yarn which: has excellent stretchability; is provided with a sufficient strength; shows high transparency; provides a good tactile sense; and has moderate fit power. There can also be provided a knitted fabric knitted by using such conjugated yarn and a clothing product using such knitted fabric. There can also be provided a method of producing a novel conjugated yarn which: has excellent stretchability; is provided with a sufficient strength; shows high transparency; provides a good tactile sense; and has moderate fit power.

Such effects can be expressed by adopting as a conjugated yarn a core-sheath type conjugated yarn having a core portion containing a double-prepolymer type polyurethane and a sheath portion containing an elastomer, the yarn being obtained by a specific method.

DESCRIPTION OF EMBODIMENTS

Hereinafter, preferred embodiments of the present invention are described. However, the present invention is not limited to these embodiments.

<<Core-Sheath Type Conjugated Yarn>>

A core-sheath type conjugated yarn of the present invention is a core-sheath type conjugated yarn having a core portion containing a polyurethane and a sheath portion containing an elastomer. Any appropriate core-sheath structure can be adopted as the core-sheath structure of the core-sheath type conjugated yarn of the present invention. For example, the core-sheath structure may be a concentric ring structure, or may be an eccentric ring structure. The core-sheath structure is preferably the concentric ring structure in order that various properties such as stretchability may be uniformly expressed.

It is important that the above-mentioned polyurethane in the core portion be not a conventional general-purpose polyurethane (such as a polyurethane obtained by a one-shot method or a prepolymer method) but a double-prepolymer type polyurethane obtained by causing a prepolymer having isocyanate groups at both terminals (hereinafter referred to as "prepolymer having NCO groups at both terminals"), which is obtained by causing a polyol and a diisocyanate to react with each other, and a prepolymer having hydroxyl groups at both terminals (hereinafter referred to as "prepolymer having OH groups at both terminals"), which is obtained by causing a polyol, a diisocyanate, and a low-molecular weight diol to react with one another, to react with each other. When the double-prepolymer type polyurethane is adopted for the core portion and the elastomer to be described later is adopted for the sheath portion, the raw materials for the core portion and the sheath portion easily have high melting points and are comparable in melting viscosity to each other, and hence a conjugated yarn having stable spinnability and an excellent degree of symmetry can be obtained. Further, a novel conjugated yarn which has excellent stretchability as well as high transparency and a good tactile sense, which is provided with a sufficient strength, and which has moderate fit power can be provided. A nitrogen content in the above-mentioned double-prepolymer type polyurethane is preferably 3.2 to 4.5%, more preferably 3.4 to 4.0%. In addition, a residual NCO ratio at the time of spinning in the above-mentioned double-prepolymer type polyurethane is preferably 0.2 to 0.8%, more preferably 0.4 to 0.7%. The effects of the present invention can be expressed to an additionally large extent by adjusting the above-mentioned nitrogen content and the above-mentioned residual NCO ratio within the above-mentioned ranges depending on the properties of the sheath raw material to be used in combination and the physical properties of a conjugated yarn to be demanded.

The above-mentioned polyol is preferably a polymer diol having a number-average molecular weight of 800 to 3000. Examples of the polymer diol include a polyether glycol, a polyester glycol, and a polycarbonate glycol. The polyol forming the above-mentioned prepolymer having NCO groups at both terminals and the polyol forming the above-mentioned prepolymer having OH groups at both terminals may be identical to or different from each other.

Examples of the above-mentioned polyether glycol include: ring-opening polymers of cyclic ethers such as ethylene oxide, propylene oxide, and tetrahydrofuran; and polycondensates of glycols such as ethylene glycol, propylene glycol, 1,4-butanediol, 1,5-pentanediol, neopentyl glycol, 1,6-hexanediol, and 3-methyl-1,5-pentanediol.

Examples of the above-mentioned polyester glycol include: a polycondensate of at least one kind selected from glycols such as ethylene glycol, propylene glycol, 1,4-butanediol, 1,5-pentanediol, neopentyl glycol, 1,6-hexanediol, and 3-methyl-1,5-pentanediol, with at least one kind selected from dibasic acids such as adipic acid, sebacic acid, and azelaic acid; and ring-opening polymers of lactones such as ε-caprolactone and valerolactone.

Examples of the above-mentioned polycarbonate glycol include a carbonate glycol obtained by a transesterification reaction of at least one kind of an organic carbonate selected from: dialkyl carbonates such as dimethyl carbonate and diethyl carbonate; alkylene carbonates such as ethylene carbonate and propylene carbonate; and diaryl carbonates such as diphenyl carbonate and dinaphthyl carbonate, with at least one kind of aliphatic diol selected from ethylene glycol, propylene glycol, 1,4-butanediol, 1,5-pentanediol, neopentyl glycol, 1,6-hexanediol, and 3-methyl-1,5-pentanediol.

Any appropriate diisocyanate such as an aliphatic, alicyclic, aromatic, or aromatic-aliphatic diisocyanate may be used as the above-mentioned diisocyanate. Specific examples of the diisocyanate include 4,4'-diphenylmethane diisocyanate, 2,4-tolylene diisocyanate, 1,5-naphthalene diisocyanate, xylylene diisocyanate, hydrogenated xylylene diisocyanate, isophorone diisocyanate, 1,6-hexamethylene diisocyanate, p-phenylene diisocyanate, 4,4'-dicyclohexylmethane diisocyanate, meta-tetramethylxylene diisocyanate, and para-tetramethylxylene diisocyanate. They may be used alone or in combination. Of those, 4,4'-diphenylmethane diisocyanate and 4,4'-dicyclohexylmethane diisocyanate are preferably used.

The above-mentioned low-molecular weight diol as a chain-lengthening agent is preferably a diol having an appropriate reaction rate and capable of imparting moderate heat resistance, and a low-molecular weight compound having two active hydrogen atoms each capable of reacting with an isocyanate and a molecular weight of generally 500 or less is used.

Examples of the above-mentioned low-molecular weight diol include aliphatic diols such as ethylene glycol, propylene glycol, 1,4-butanediol, 1,5-pentanediol, neopentyl glycol, 1,6-hexanediol, and 3-methyl-1,5-pentanediol. Trifunctional glycols such as glycerin are also used to such an extent that spinnability is not impaired. They may be used alone or in combination. Ethylene glycol and 1,4-butanediol are preferred in terms of workability and the impartment of moderate physical properties to the resultant fibers.

A monofunctional monool such as butanol, or a monofunctional monoamine such as diethylamine or dibutylamine can be used as a reaction regulator or a polymerization degree regulator at the time of the above-mentioned reaction.

An inert solvent that can be used as a solvent in the above-mentioned reaction is, for example, a polar solvent such as N,N-dimethylformamide, N,N-dimethylacetamide, N,N,N', N'-tetramethyl urea, N-methylpyrrolidone, or dimethyl sulfoxide.

The above-mentioned core portion can contain any appropriate component such as a UV absorbing agent, an antioxidant, or a light stabilizer as well as the above-mentioned double-prepolymer type polyurethane for improvements in weatherability, thermal oxidation resistance, and yellowing resistance.

Examples of the above-mentioned UV absorbing agent include benzotriazole-based UV absorbing agents such as 2-(3,5-di-t-amyl-2-hydroxyphenyl)benzotriazole, 2-(3-t-butyl-5-methyl-2-hydroxyphenyl)-5-chlorobenzotriazole, and 2-(2-hydroxy-3,5-bisphenyl)benzotriazole.

Examples of the above-mentioned antioxidant include hindered phenol-based antioxidants such as 3,9-bis(2-(3-(3-t-butyl-4-hydroxy-5-methylphenyl)-propionyloxy)-1,1-dimethylethyl)-2,4,8,10-tetraoxaspiro(5.5)undecane, 1,3,5-tris (4-t-butyl-3-hydroxy-2,6-dimethylbenzyl)isocyanuric acid, and pentaerythrityl-tetrakis[3-(3,5-di-t-butyl-4-hydroxyphenyl)propionate].

Examples of the above-mentioned light stabilizer include hindered amine-based light stabilizers such as bis(2,2,6,6-tetramethyl-4-piperidyl)sebacate, bis(1,2,2,6,6-pentamethyl-4-piperidyl)sebacate, and a dimethyl succinate-1-(2-hydroxyethyl)-4-hydroxy-2,2,6,6-tetramethylpiperidine condensate.

The content of the above-mentioned double-prepolymer type polyurethane in the above-mentioned core portion is preferably 80 wt % or more, more preferably 90 wt % or more, still more preferably 100 wt %.

With regard to a raw material ratio for obtaining the above-mentioned double-prepolymer type polyurethane, a ratio of the molar amount of the diisocyanates to the total molar amount of all the polyols and all the low-molecular weight diols is preferably 1.02 to 1.20.

Any appropriate elastomer can be adopted as the elastomer in the sheath portion. As is generally known, the elastomer is a polymer substance showing elasticity. The elastomer has such dynamic property (rubber elasticity) as to easily change by an external force but to immediately return to a form close to its original form by the removal of the external force.

Examples of the above-mentioned elastomer include: vulcanized rubbers of a natural rubber, a synthetic rubber, and the like; thermoplastic elastomers; elastic fibers such as spandex and polycarbonate elastic fibers; and elastic foams such as a sponge rubber and a foam rubber.

In the present invention, a thermoplastic elastomer is preferably adopted as the above-mentioned elastomer. The above-mentioned thermoplastic elastomer is a polymer material which shows the properties of a vulcanized rubber at normal temperature and which is plasticized at high temperatures so as to be formable with a plastic processing machine, and is referred to as "TPE". Examples of the above-mentioned thermoplastic elastomer include a polystyrene-based elastomer, a polyolefin-based elastomer, a polyester-based elastomer, a polyurethane-based elastomer, a 1,2-polybutadiene-based elastomer, a polyvinyl chloride-based elastomer, and a polyamide-based elastomer.

The above-mentioned elastomer has a melting point of preferably 160 to 240° C., more preferably 180 to 220° C. When the melting point of the above-mentioned elastomer is less than 160° C., the strength of a gray yarn may reduce owing to a low melting viscosity. When the melting point of the above-mentioned elastomer exceeds 240° C., elastic performance may reduce. In addition, when the melting point of the above-mentioned elastomer is excessively high, the melting point may exceed the decomposition temperature of the double-prepolymer type polyurethane of the core portion, and hence the resultant conjugated yarn may undergo discharge unevenness or reductions in physical properties.

In the present invention, the above-mentioned elastomer is preferably at least one kind selected from polyester-based elastomers and polyamide-based elastomers.

Examples of the above-mentioned polyester-based elastomers include a polyethylene terephthalate elastomer, a polybutylene terephthalate elastomer, and a polyethylene naphthalate elastomer. Commercially available products may be used as the above-mentioned polyester-based elastomers. More specific examples of the polyester-based elastomers include a block copolymer formed of a polyester block and a polyether block.

Examples of the above-mentioned polyamide-based elastomers include a nylon-6/nylon-12 copolymer and a nylon-12/polyether copolymer. Commercially available products may be used as the above-mentioned polyamide-based elastomers.

The above-mentioned sheath portion can contain any appropriate component such as a UV absorbing agent, an antioxidant, or a light stabilizer as well as the above-mentioned elastomer for improvements in weatherability, thermal oxidation resistance, and yellowing resistance.

Examples of the above-mentioned UV absorbing agent include benzotriazole-based UV absorbing agents such as 2-(3,5-di-t-amyl-2-hydroxyphenyl)benzotriazole, 2-(3-t-butyl-5-methyl-2-hydroxyphenyl)-5-chlorobenzotriazole, and 2-(2-hydroxy-3,5-bisphenyl)benzotriazole.

Examples of the above-mentioned antioxidant include hindered phenol-based antioxidants such as 3,9-bis(2-(3-(3-t-butyl-4-hydroxy-5-methylphenyl)-propionyloxy)-1,1-dimethylethyl)-2,4,8,10-tetraoxaspiro(5.5)undecane, 1,3,5-tris (4-t-butyl-3-hydroxy-2,6-dimethylbenzyl)isocyanuric acid, and pentaerythrityl-tetrakis[3-(3,5-di-t-butyl-4-hydroxyphenyl)propionate].

Examples of the above-mentioned light stabilizer include hindered amine-based light stabilizers such as bis(2,2,6,6-tetramethyl-4-piperidyl)sebacate, bis(1,2,2,6,6-pentamethyl-4-piperidyl)sebacate, and a dimethyl succinate-1-(2-hydroxyethyl)-4-hydroxy-2,2,6,6-tetramethylpiperidine condensate.

The content of the above-mentioned elastomer in the above-mentioned sheath portion is preferably 80 wt % or more, more preferably 90 wt % or more, still more preferably 100 wt %.

The core-sheath type conjugated yarn of the present invention is a core-sheath type conjugated yarn having the above-mentioned specific core portion and the above-mentioned specific sheath portion. With regard to a ratio between a resin forming the core portion (preferably containing 100 wt % of the above-mentioned double-prepolymer type polyurethane) and a resin forming the sheath portion (preferably containing 100 wt % of the above-mentioned elastomer) in the core-sheath type conjugated yarn of the present invention, a weight ratio of the core portion to the sheath portion is 95/5 to 60/40, preferably 90/10 to 70/30, more preferably 90/10 to 80/20. When the weight ratio of the core portion to the sheath portion deviates from the above-mentioned range, the effects of the present invention may not be sufficiently expressed.

The core-sheath type conjugated yarn of the present invention has a fineness of 18 to 110 dtex, preferably 20 to 100 dtex, more preferably 22 to 78 dtex. When the above-mentioned fineness is less than 18 dtex, the strength of a knitted fabric made of the yarn may be insufficient. When the above-mentioned fineness exceeds 110 dtex, the knitted fabric may be difficult to wear when turned into, for example, a leg knitted fabric product.

The tenacity of the core-sheath type conjugated yarn of the present invention can be adjusted to any appropriate tenacity depending on applications. For example, when the core-sheath type conjugated yarn of the present invention is used in a leg knitted fabric product, the tenacity is preferably 20 to 200 cN, more preferably 30 to 180 cN. A method of measuring the tenacity is described later.

The strength of the core-sheath type conjugated yarn of the present invention can be adjusted to any appropriate strength depending on applications. For example, when the core-sheath type conjugated yarn of the present invention is used in a leg knitted fabric product, the strength is preferably 1.5 cN/dtex or more. A method of measuring the strength is described later.

The elongation percentage of the core-sheath type conjugated yarn of the present invention can be adjusted to any appropriate elongation percentage depending on applications. For example, when the core-sheath type conjugated yarn of the present invention is used in a leg knitted fabric product, the elongation percentage is preferably 150 to 500%. A method of measuring the elongation percentage is described later.

The 120% tensile stress of the core-sheath type conjugated yarn of the present invention can be adjusted to any appropriate 120% tensile stress depending on applications. For example, when the core-sheath type conjugated yarn of the present invention is used in a leg knitted fabric product, the 120% tensile stress is preferably 5 cN or more. A method of measuring the 120% tensile stress is described later.

The 100% tensile residual strain of the core-sheath type conjugated yarn of the present invention can be adjusted to any appropriate 100% tensile residual strain depending on applications. For example, when the core-sheath type conjugated yarn of the present invention is used in a leg knitted fabric product, the 100% tensile residual strain is preferably 1 to 30%. A method of measuring the 100% tensile residual strain is described later.

The stress after 100% tensile relaxation of the core-sheath type conjugated yarn of the present invention can be adjusted to any appropriate stress after 100% tensile relaxation depending on applications. For example, when the core-sheath type conjugated yarn of the present invention is used in a leg knitted fabric product, the stress after 100% tensile relaxation is preferably 2 cN or more. A method of measuring the stress after 100% tensile relaxation is described later.

The core-sheath type conjugated yarn of the present invention can be produced by adopting any appropriate method as long as a core-sheath type conjugated yarn having the above-mentioned specific core portion and the above-mentioned specific sheath portion can be obtained by the method. Preferably adopted can be a method involving: melting each of a resin forming the core portion (preferably containing 100 wt % of the above-mentioned double-prepolymer type polyurethane) and a resin forming the sheath portion (preferably containing 100 wt % of the above-mentioned elastomer) at any appropriate temperature; and subjecting the molten resins to conjugate spinning with a nozzle having two conjugate nozzles so that the resin forming the core portion may serve as the core portion and the resin forming the sheath portion may serve as the sheath portion. Specifically, the core-sheath type conjugated yarn of the present invention can be preferably produced by a production method of the present invention. That is, the production method of the present invention is a method of producing a core-sheath type conjugated yarn having a core portion containing a polyurethane and a sheath portion containing an elastomer, the method including subjecting a resin containing the polyurethane and a resin containing the elastomer to conjugate spinning, in which: the polyurethane is obtained by causing a prepolymer having isocyanate groups at both terminals, which is obtained by causing a polyol and a diisocyanate to react with each other, and a prepolymer having hydroxyl groups at both terminals, which is obtained by causing a polyol, a diisocyanate, and a low-molecular weight diol to react with one another, to react with each other; and the conjugate spinning is performed under conditions of a fineness of 18 to 110 dtex, a weight ratio of the core portion to the sheath portion of 95/5 to 60/40, and a drawing ratio of 1.5 to 4.0. The above-mentioned description for the core-sheath type conjugated yarn of the present invention is incorporated by reference for the description of various raw materials, spinning conditions, and the like related to the production method of the present invention, such as a method of obtaining the polyurethane, the kind of the elastomer, and preferred ranges of the conditions for the conjugate spinning.

Through conjugation at a drawing ratio of 1.5 to 4.0, the core-sheath type conjugated yarn of the present invention can: have excellent stretchability; be provided with a sufficient strength; show high transparency; provide a good tactile sense; and have moderate fit power.

A core-sheath type conjugated yarn has conventionally expressed its strength and stretchability by stretching a yarn completed by conjugation under heat to provide a crimp. However, the core-sheath type conjugated yarn of the present invention has excellent stretchability, is provided with a sufficient strength, shows high transparency, provides a good tactile sense, and has moderate fit power even when no crimp is present. Accordingly, there is no need to further stretch a yarn completed by conjugation under heat upon production of the core-sheath type conjugated yarn of the present invention.

A knitted fabric of the present invention is knitted by using the core-sheath type conjugated yarn of the present invention at least partly. The mode of the knitted fabric of the present invention is, for example, a Zokki knitted fabric knitted out of the core-sheath type conjugated yarn of the present invention alone, an interknit fabric obtained by alternately weaving the core-sheath type conjugated yarn of the present invention and any other yarn, or a knitted fabric obtained by knitting the core-sheath type conjugated yarn and at least one kind of other yarn together or by sharing the yarns by a method such as plating knitting or inlay. In the case of the Zokki knitted fabric, the knitted fabric is free of horizontal stripes and has a uniformly finished surface. In the case of the interknit fabric, a difference in course interval arises as a result of a difference in stress or heat setting ratio between the core-sheath type conjugated yarn of the present invention and the other yarn, and hence transparency is improved.

Examples of the above-mentioned other yarn include: composite yarns such as a covering yarn, a cored yarn, a piled yarn, and an air-entangled yarn; natural fibers such as cotton, hemp, wool, and silk; regenerated fibers such as rayon, cupra, and polynosic; semi-regenerated fibers such as an acetate; and chemical synthetic fibers such as nylon, polyester, acryl, polypropylene, vinyl chloride, and polyurethane.

Any appropriate knit texture can be adopted as a knit texture depending on applications. Examples of the knit texture include: weft knitted fabrics such as a plain stitch, a rib stitch, and a pearl stitch; and warp knitted fabrics such as a tricot and a raschel. The weft knitted fabrics are preferred, and the plain stitch is frequently used as the knit texture. A derivative weave of the plain stitch is, for example, a tuck stitch, a float stitch, a pile stitch, or a lace stitch.

Any appropriate knitting machine can be adopted as a knitting machine to be used upon production of the knitted fabric of the present invention depending on purposes. Examples of the knitting machine include a stocking knitting machine, a hosiery machine, a garment length knitting machine, a circular knitting machine, a plain knitting machine, and a form knitting machine. Conditions under which the knitted fabric is produced (such as the number of counts, a stretch size, a density, and a draft rate) can be appropriately set to any appropriate conditions depending on purposes.

The knitted fabric of the present invention may be subjected to heat setting after having been knitted with the knitting machine in order that its knitted loops and dimensions may be stabilized. Any appropriate setting machine can be adopted as a setting machine for performing the heat setting.

Hereinafter, processing steps in the case where a stocking knitted fabric is obtained by using the core-sheath type conjugated yarn of the present invention are described. However, the present invention is not limited to these embodiments.

Presetting is typically performed in the foregoing in order that the knitted loops and the dimensions may be stabilized. Here, a wet heat treatment is performed at 80° C. for about 30 minutes. After the presetting, when a leg knitted fabric product is formed of respective portions, the form of the leg knitted fabric product is established by sewing, for example, toe and panty portions with a sewing machine as required. Further, a dyeing process and the like are performed as required. The process and the like can be freely set depending on whether or not a shared fiber or the core-sheath type conjugated yarn is dyed, and can be performed under known conditions by known steps.

The heat setting to be performed is wet heat setting or dry heat setting. The wet heat setting can be performed with, for example, a steam setter manufactured by ASHIDA MFG. CO., LTD. by: opening a steam-passing valve at a main steam pressure of 2.5 to 3.0 kgf/cm$^2$; bringing steam into a closed setting room; and controlling the temperature inside the setting room to a predetermined temperature. The dry heat setting can be performed with a setting machine such as a pin stenter by heat fixation with hot air. The temperature of the wet heat setting is preferably 80 to 140° C., more preferably 90 to 135° C., still more preferably 105 to 125° C. In the wet heat setting, the knitted fabric is mounted on a template, placed in the setting room, and set for a predetermined time. When the temperature of the heat setting is excessively low or the time is excessively short, a setting effect may be insufficient or the dimensional stability of the knitted fabric may reduce. When the temperature of the heat setting is excessively high or the time is excessively long, a reduction in tenacity, or the heat discoloration, of the fiber may occur, handling may become hard, or shrinking property may deteriorate. In the case of the wet heat setting, it is preferred that the knitted fabric be placed in a drying room at about 120° C. and dried for about 30 seconds.

The knitted fabric of the present invention can be suitably used in a leg knitted fabric product such as a stocking because the knitted fabric uses the core-sheath type conjugated yarn of the present invention which: has excellent stretchability; is provided with a sufficient strength; shows high transparency; provides a good tactile sense; and has moderate fit power. However, the application of the knitted fabric is not limited to the foregoing, and the knitted fabric can find use in applications such as other clothing as well. That is, the knitted fabric of the present invention can suitably find use in a wide variety of clothing products.

<<Physical Properties of Gray Yarn in Knitted Fabric>>

The knitted fabric of the present invention has excellent stretchability, is provided with a sufficient strength, shows high transparency, provides a good tactile sense, and has moderate fit power as compared particularly with a conventional knitted fabric because the former knitted fabric uses the core-sheath type conjugated yarn of the present invention. The excellent effects are clearly demonstrated by: extracting a gray yarn portion derived from the core-sheath type conjugated yarn of the present invention in the knitted fabric of the present invention from a clothing product; and evaluating the gray yarn portion for its physical properties.

For example, the 120% tensile stress of the above-mentioned gray yarn portion extracted from the clothing product, i.e., knitted fabric of the present invention is preferably 5.8 to 20 cN, more preferably 6.0 to 20 cN, still more preferably 6.2 to 20 cN. The 120% tensile stress of the above-mentioned gray yarn portion extracted from the knitted fabric of the present invention provides an indicator for the strength of the knitted fabric felt at the initial stage of wearing when the knitted fabric is used in a leg knitted fabric product such as a stocking. When the above-mentioned 120% tensile stress falls within the above-mentioned range, the strength of the above-mentioned knitted fabric felt at the initial stage of wearing when the knitted fabric is used in a leg knitted fabric product such as a stocking, that is, ease of wearing and durability are extremely excellent. A method of measuring the 120% tensile stress is described later.

In addition, for example, the stress after 100% tensile relaxation of the above-mentioned gray yarn portion extracted from the knitted fabric of the present invention is preferably 3.8 to 10 cN, more preferably 4.0 to 10 cN, still more preferably 4.2 to 10 cN. The stress after 100% tensile relaxation of the above-mentioned gray yarn portion extracted from the knitted fabric of the present invention provides an indicator for a tight feeling felt during wearing when the knitted fabric is used in a leg knitted fabric product such as a stocking. When the above-mentioned stress after 100% tensile relaxation falls within the above-mentioned range, the tight feeling felt during wearing when the above-mentioned knitted fabric is used in a leg knitted fabric product such as a stocking is extremely excellent. A method of measuring the stress after 100% tensile relaxation is described later.

EXAMPLES

Hereinafter, the present invention is specifically described by way of examples. However, the present invention is not limited by these examples.

<Method of Measuring 120% Tensile Stress (cN)>

The tension of a yarn when a cheese was delivered at a rate of 50 m/min and wound at a rate of 110 m/min under an environment having a room temperature of 20° C. and a humidity of 65% was measured, and was then defined as a 120% tensile stress.

In addition, the 120% tensile stress of a yarn extracted from a product was measured by a method involving: applying a load of 0.1 g to the sample under an environment having a room temperature of 20° C. and a humidity of 65% at a grasping length of 4 cm to provide a sample in an initial state; elongating the sample at a rate of 30 cm/min; and measuring the stress when the length reached 8.8 cm.

<Method of Measuring Tenacity (cN)>

A load of 0.1 g was applied to a sample under an environment having a room temperature of 20° C. and a humidity of 65% at a grasping length of 4 cm so that a sample in an initial state was provided. The sample in the initial state was elongated at a rate of 30 cm/min, and then a stress at the time of its rupture was measured. Ten yarns per kind of sample were subjected to the measurement, and the average of the measured values was defined as the tenacity of the sample.

<Method of Calculating Strength (cN/dtex)>

Calculation was performed on the basis of the calculation equation "strength (cN/dtex)=tenacity (cN)/fineness (dtex)".

<Method of Measuring Elongation Percentage (%)>

A load of 0.1 g was applied to a sample under an environment having a room temperature of 20° C. and a humidity of 65% at a grasping length of 4 cm so that a sample in an initial state was provided. The sample was elongated at a rate of 30 cm/min until its rupture, and then a sample length "A" at the time of the rupture was measured. Next, a load of 0.1 g was applied to the sample at a grasping length of 8 cm so that an initial state was established. The sample was elongated at a rate of 30 cm/min until its rupture, and then a sample length "B" at the time of the rupture was measured. Seven yarns per kind of sample were subjected to the measurement at grasping lengths of 4 cm and 8 cm each, and each average of the measured values of five yarns excluding the upper limit and the lower limit was used in the calculation of the elongation percentage of the sample from the following equation.

$$\text{Elongation percentage}(\%)=(B-A)/(8-4)\times 100$$

<Method of Measuring 100% Tensile Residual Strain (%)>

A load of 0.1 g was applied to a sample under an environment having a room temperature of 20° C. and a humidity of 65% at a grasping length of 4 cm so that a sample in an initial state was provided. The sample in the initial state was elongated so as to have a sample length of 8 cm, and was then relaxed until its length became 4 cm. The operation was repeated twice. During the operations, stresses were measured, the stresses and elongation lengths were illustrated in a chart, an elongation length "C" of the sample when the sample was relaxed in the second operation so that its stress was 0 was measured, and a 100% tensile residual strain (%) was determined from the following equation. It should be noted that five yarns per kind of sample were subjected to the measurement and the average of the measured values was defined as the 100% tensile residual strain of the sample.

$$100\% \text{ tensile residual strain}(\%)=C/40\times 100$$

<Method of Measuring Stress after 100% Tensile Relaxation (cN)>

A load of 0.1 g was applied to a sample under an environment having a room temperature of 20° C. and a humidity of 65% at a grasping length of 4 cm so that a sample in an initial state was provided. The sample was elongated at a rate of 30 cm/min and retained when its length reached 8 cm, and further, stresses during the retention were measured. A value for the stress after a lapse of 15 minutes from the initiation of the retention was defined as a stress after 100% tensile relaxation (cN).

<Wearing Evaluation: Tight Feeling (Power Feeling)>

A produced pantyhose knitted fabric was evaluated by five monitors for its tight feeling (power feeling) through repeated wearing and washing for three days.

◎: A sufficient tight feeling is obtained in a continuous fashion.

○: A moderate tight feeling is obtained in a substantially continuous fashion.

Δ: A tight feeling is slight, or the tight feeling reduces with time.

x: A tight feeling is insufficient after wearing.

<Wearing Evaluation: Durability (Difficulty in Ripping)>

A produced pantyhose knitted fabric was evaluated by five monitors for its durability through repeated wearing and washing for three days.

○: No ripping occurred during the test period.

Δ: Partial ripping occurred as a result of repeated wearing.

x: Ripping occurred immediately after wearing.

<Wearing Evaluation: Ease of Wearing (Elongation Feeling and Strength)>

A produced pantyhose knitted fabric was evaluated by five monitors for its ease of wearing (elongation feeling and strength) through repeated wearing and washing for three days.

◎: The pantyhose knitted fabric is extremely easy to wear because both of its strength and elongation feeling are appropriate.

○: The pantyhose knitted fabric is normally easy to wear.

Δ: The pantyhose knitted fabric is somewhat difficult to wear because its strength or elongation feeling is insufficient.

x: The pantyhose knitted fabric is extremely difficult to wear because the pantyhose knitted fabric does not elongate or is weak.

<Wearing Evaluation: Transparency>

A produced pantyhose knitted fabric was passed through a black, acrylic flat plate (measuring 10 cm wide by 88 cm long), and was then evaluated for its transparency by visual observation.

◎: The pantyhose knitted fabric is extremely excellent in transparency.

○: The pantyhose knitted fabric is excellent in transparency.

Δ: The pantyhose knitted fabric is superior in transparency to a conventional product, but its transparency is insufficient.

x: The pantyhose knitted fabric has insufficient transparency.

Example 1-A (Core Component)

First, 6.8 parts by weight of 4,4'-diphenylmethane diisocyanate were caused to react with 13.8 parts by weight of a polytetramethylene glycol (molecular weight: 1000) having hydroxyl groups at both terminals at a reaction temperature of 80° C. for a reaction time of 60 minutes. Thus, a precursor was obtained. Then, 7.5 parts by weight of 1,4-butylene glycol were caused to continuously react with 20.6 parts by weight of the resultant precursor under conditions of a reaction temperature of 80° C. and a reaction time of 60 minutes while the contents were stirred. Thus, a hydroxyl group terminal prepolymer was obtained.

Meanwhile, 24.9 parts by weight of 4,4'-diphenylmethane diisocyanate, and further, 1.6 parts by weight of a mixture of a UV absorbing agent (2-[2-hydroxy-3,5-bis(α,α-dimethylbenzyl)phenyl]-2H-benzotriazole (TIN234): 20%), an antioxidant (3,9-bis(2-(3-(3-t-butyl-4-hydroxy-5-methylphenyl)-propionyloxy)-1,1-dimethylethyl)-2,4,8,10-tetraoxaspiro(5.5)undecane: 50%), and a light stabilizer (bis (2,2,6,6-tetramethyl-4-piperidyl)sebacate: 30%) were caused to continuously react with 45.4 parts by weight of a polyethylene adipate (molecular weight: 2100) having hydroxyl groups at both terminals under conditions of a reaction temperature of 80° C. and a reaction time of 60 minutes while the contents were stirred. Thus, an isocyanate terminal prepolymer was obtained.

Next, 28.1 parts by weight of the hydroxyl group terminal prepolymer thus obtained and 71.9 parts by weight of the isocyanate terminal prepolymer were continuously injected into a scraped-surface type heat exchange reactor, and then the contents were mixed and stirred under conditions of a reaction temperature of 190° C. and a retention time of 30 minutes.

The resultant viscous product was immediately introduced into the core portion of a concentric, core-sheath type conjugate spinning nozzle (having a nozzle diameter of 0.7 mm) with a spinning pump.

(Sheath Component)

A PRIMALLOY B1920N (polybutylene terephthalate elastomer) manufactured by Mitsubishi Chemical Corporation as a polyester-based elastomer was melted with a uniaxial extruder at 220° C., and was then introduced into the sheath portion of the same concentric, core-sheath type conjugate spinning nozzle as that described above.

(Spinning of Conjugated Yarn)

The core component and the sheath component were adjusted with a metering GP so that their weight ratio was 90:10. After that, the components were supplied to a core-sheath type conjugate spinning nozzle adjusted to 225° C., and were then extruded through the nozzle. An oil solution mainly formed of dimethyl silicone was applied to the extruded product, and then a conjugated yarn (1) was wound at a spinning rate of 700 m/min, a drawing ratio of 3.0, and a fineness of 33 dtex. A state of discharge from the nozzle was stable, no end breakage occurred, and hence spinnability was good. In addition, the resultant conjugated yarn (1) had a good degree of symmetry.

Table 1 shows the various physical properties of the resultant conjugated yarn (1).

Example 1-B (Production of Knitted Fabric)

The conjugated yarn (1) obtained in Example 1-A was fed to the feeder of a pantyhose knitting machine (L416/R manufactured by Ronati, kettle diameter: 4 inches, number of needles: 400), and then a pantyhose knitted fabric was produced at a count of 2400 courses and a stretch size of 55 cm. The resultant knitted fabric was treated by the following steps.

(1) Presetting

A wet heat treatment was performed at 80° C. for 15 minutes once (for stabilizing knitted loops and dimensions).

(2) Sewing

Panty and toe portions were sewed with a pair closer or a sewing machine.

(3) Dyeing

Dyeing was performed under conditions of 95° C. and 40 minutes.

(4) Wet Heat Setting Treatment

In a steam setter manufactured by ASHIDA MFG. CO., LTD., the resultant was elongated by a factor of 1.2 in a well direction in a state of being placed in an aluminum template having a width of 11 cm, and was then subjected to wet heat setting at 110° C. for 10 seconds while being kept in the state. Thus, a pantyhose knitted fabric (1) was obtained.

The conjugated yarn (1) was extracted from the resultant pantyhose knitted fabric (1), and then its various physical properties were measured. Table 3 shows the results.

In addition, the resultant pantyhose knitted fabric (1) was subjected to wearing evaluations. Table 5 shows the results.

The resultant pantyhose knitted fabric (1) was a knitted fabric having excellent transparency that had never existed before. In addition, the knitted fabric provided an excellent tight feeling irrespective of the fact that the knitted fabric was a thin textile. Further, the knitted fabric had comfortable wearing property because of its ease of wearing and durability.

Example 2-A

A conjugated yarn (2) was wound in the same manner as in Example 1-A except that: a PRIMALLOY 1910N (polybutylene terephthalate elastomer) manufactured by Mitsubishi Chemical Corporation was used instead of the PRIMALLOY B1920N (polybutylene terephthalate elastomer) manufactured by Mitsubishi Chemical Corporation in the sheath component; and a weight ratio of the core component to the sheath component, a fineness, and a drawing ratio upon spinning were set to 80:20, 44 dtex, and 2.5, respectively. A state of discharge from the nozzle was stable, no end breakage occurred, and hence spinnability was good. In addition, the resultant conjugated yarn (2) had a good degree of symmetry.

Table 1 shows the various physical properties of the resultant conjugated yarn (2).

Example 2-B

A pantyhose knitted fabric (2) was obtained in the same manner as in Example 1-B by using the conjugated yarn (2) obtained in Example 2-A.

The conjugated yarn (2) was extracted from the resultant pantyhose knitted fabric (2), and then its various physical properties were measured. Table 3 shows the results.

In addition, the resultant pantyhose knitted fabric (2) was subjected to wearing evaluations. Table 5 shows the results.

The resultant pantyhose knitted fabric (2) was a knitted fabric having excellent transparency that had never existed before. In addition, the knitted fabric provided an excellent tight feeling irrespective of the fact that the knitted fabric was a thin textile. Further, the knitted fabric had comfortable wearing property because of its ease of wearing and durability.

Example 3-A

A conjugated yarn (3) was wound in the same manner as in Example 1-A except that a fineness upon spinning was set to 110 dtex. A state of discharge from the nozzle was stable, no end breakage occurred, and hence spinnability was good. In addition, the resultant conjugated yarn (3) had a good degree of symmetry.

Table 1 shows the various physical properties of the resultant conjugated yarn (3).

Example 3-B

A pantyhose knitted fabric (3) was obtained in the same manner as in Example 1-B by using the conjugated yarn (3) obtained in Example 3-A.

The conjugated yarn (3) was extracted from the resultant pantyhose knitted fabric (3), and then its various physical properties were measured. Table 3 shows the results.

In addition, the resultant pantyhose knitted fabric (3) was subjected to wearing evaluations. Table 5 shows the results.

The resultant pantyhose knitted fabric (3) had good transparency, had an increased tenacity, and was able to provide strong tightening forces at each of the time of, and after, wearing. Further, the knitted fabric had comfortable wearing property because of its ease of wearing and durability.

Example 4-A

A conjugated yarn (4) was wound in the same manner as in Example 1-A except that a weight ratio of the core portion to the sheath portion upon spinning was set to 60:40. A state of discharge from the nozzle was stable, no end breakage occurred, and hence spinnability was good. In addition, the resultant conjugated yarn (4) had a good degree of symmetry.

Table 1 shows the various physical properties of the resultant conjugated yarn (4).

Example 4-B

A pantyhose knitted fabric (4) was obtained in the same manner as in Example 1-B by using the conjugated yarn (4) obtained in Example 4-A.

The conjugated yarn (4) was extracted from the resultant pantyhose knitted fabric (4), and then its various physical properties were measured. Table 3 shows the results.

In addition, the resultant pantyhose knitted fabric (4) was subjected to wearing evaluations. Table 5 shows the results.

The resultant pantyhose knitted fabric (4) was a knitted fabric having excellent transparency that had never existed before. In addition, the knitted fabric provided an excellent tight feeling irrespective of the fact that the knitted fabric was a thin textile. Further, the knitted fabric had comfortable wearing property because of its ease of wearing and durability.

Example 5-A

A conjugated yarn (5) was wound in the same manner as in Example 1-A except that a drawing ratio upon spinning was set to 1.8.

Table 1 shows the various physical properties of the resultant conjugated yarn (5).

Example 5-B

A pantyhose knitted fabric (5) was obtained in the same manner as in Example 1-B by using the conjugated yarn (5) obtained in Example 5-A.

The conjugated yarn (5) was extracted from the resultant pantyhose knitted fabric (5), and then its various physical properties were measured. Table 3 shows the results.

In addition, the resultant pantyhose knitted fabric (5) was subjected to wearing evaluations. Table 5 shows the results.

The resultant pantyhose knitted fabric (5) had good transparency, and provided appropriate tightening forces at the time of, and after, wearing. Further, the knitted fabric had comfortable wearing property because of its ease of wearing and durability.

Example 6-A

A conjugated yarn (6) was wound in the same manner as in Example 1-A except that a drawing ratio upon spinning was set to 4.0.

Table 1 shows the various physical properties of the resultant conjugated yarn (6).

Example 6-B

A pantyhose knitted fabric (6) was obtained in the same manner as in Example 1-B by using the conjugated yarn (6) obtained in Example 6-A.

The conjugated yarn (6) was extracted from the resultant pantyhose knitted fabric (6), and then its various physical properties were measured. Table 3 shows the results.

In addition, the resultant pantyhose knitted fabric (6) was subjected to wearing evaluations. Table 5 shows the results.

The resultant pantyhose knitted fabric (6) had good transparency, and provided sufficient tightening forces at the time of, and after, wearing. Further, the knitted fabric had comfortable wearing property because of its relative ease of wearing and sufficient durability.

Example 7-A (Core Component)

First, 6.6 parts by weight of 4,4'-diphenylmethane diisocyanate were caused to react with 13.5 parts by weight of a polytetramethylene glycol (molecular weight: 1000) having hydroxyl groups at both terminals at a reaction temperature of 80° C. for a reaction time of 60 minutes. Thus, a precursor was obtained. Then, 7.4 parts by weight of 1,4-butylene glycol were caused to continuously react with 20.1 parts by weight of the resultant precursor under conditions of a reaction temperature of 80° C. and a reaction time of 60 minutes while the contents were stirred. Thus, a hydroxyl group terminal prepolymer was obtained.

Meanwhile, 25.0 parts by weight of 4,4'-diphenylmethane diisocyanate, and further, 1.7 parts by weight of a mixture of a UV absorbing agent (2-[2-hydroxy-3,5-bis(α,α-dimethylbenzyl)phenyl]-2H-benzotriazole (TIN234): 20%), an antioxidant (3,9-bis(2-(3-(3-t-butyl-4-hydroxy-5-methylphenyl)-propionyloxy)-1,1-dimethylethyl)-2,4,8,10-tetraoxaspiro(5.5)undecane: 50%), and a light stabilizer (bis (2,2,6,6-tetramethyl-4-piperidyl)sebacate: 30%) were caused to continuously react with 45.8 parts by weight of a polytetramethylene glycol (molecular weight: 1950) having hydroxyl groups at both terminals under conditions of a reaction temperature of 80° C. and a reaction time of 60 minutes while the contents were stirred. Thus, an isocyanate terminal prepolymer was obtained.

Next, 27.5 parts by weight of the hydroxyl group terminal prepolymer thus obtained and 72.5 parts by weight of the isocyanate terminal prepolymer were continuously injected into a scraped-surface type heat exchange reactor, and then the contents were mixed and stirred under conditions of a reaction temperature of 190° C. and a retention time of 30 minutes.

The resultant viscous product was immediately introduced into the core portion of a concentric, core-sheath type conjugate spinning nozzle (having a nozzle diameter of 0.7 mm) with a spinning pump.

(Sheath Component)

A PRIMALLOY B1910N (polybutylene terephthalate elastomer) manufactured by Mitsubishi Chemical Corporation as a polyester-based elastomer was melted with a uniaxial extruder at 220° C., and was then introduced into the sheath portion of the same concentric, core-sheath type conjugate spinning nozzle as that described above.

(Spinning of Conjugated Yarn)

The core component and the sheath component were adjusted with a metering GP so that their weight ratio was 90:10. After that, the components were supplied to a core-sheath type conjugate spinning nozzle adjusted to 225° C., and were then extruded through the nozzle. An oil solution mainly formed of dimethyl silicone was applied to the extruded product, and then a conjugated yarn (7) was wound at a spinning rate of 700 m/min, a drawing ratio of 3.0, and a fineness of 33 dtex. A state of discharge from the nozzle was stable, no end breakage occurred, and hence spinnability was good. In addition, the resultant conjugated yarn (7) had a good degree of symmetry.

Table 1 shows the various physical properties of the resultant conjugated yarn (7).

Example 7-B

A pantyhose knitted fabric (7) was obtained in the same manner as in Example 1-B by using the conjugated yarn (7) obtained in Example 7-A.

The conjugated yarn (7) was extracted from the resultant pantyhose knitted fabric (7), and then its various physical properties were measured. Table 3 shows the results.

In addition, the resultant pantyhose knitted fabric (7) was subjected to wearing evaluations. Table 5 shows the results.

The resultant pantyhose knitted fabric (7) was a knitted fabric having excellent transparency that had never existed before. In addition, the knitted fabric provided an excellent tight feeling irrespective of the fact that the knitted fabric was a thin textile. Further, the knitted fabric had comfortable wearing property because of its ease of wearing and durability.

Example 8-A (Core Component)

First, 23.8 parts by weight of 4,4'-diphenylmethane diisocyanate were caused to react with 48.8 parts by weight of a polytetramethylene glycol (molecular weight: 1000) having hydroxyl groups at both terminals at a reaction temperature of 80° C. for a reaction time of 60 minutes. Thus, a precursor was obtained. Then, 26.4 parts by weight of 1,4-butylene glycol were caused to continuously react with 72.6 parts by weight of the resultant precursor under conditions of a reaction temperature of 80° C. and a reaction time of 60 minutes while the contents were stirred. Thus, a hydroxyl group terminal prepolymer was obtained.

Meanwhile, 100.9 parts by weight of 4,4'-diphenylmethane diisocyanate, and further, 3.9 parts by weight of a mixture of a UV absorbing agent (2-[2-hydroxy-3,5-bis(α,α-dimethylbenzyl)phenyl]-2H-benzotriazole (TIN234): 20%), an antioxidant (3,9-bis(2-(3-(3-t-butyl-4-hydroxy-5-methylphenyl)-propionyloxy)-1,1-dimethylethyl)-2,4,8,10-tetraoxaspiro(5.5)undecane: 50%), and a light stabilizer (bis(2,2,6,6-tetramethyl-4-piperidyl)sebacate: 30%) were caused to continuously react with 140.7 parts by weight of a polyethylene adipate (molecular weight: 2100) having hydroxyl groups at both terminals under conditions of a reaction temperature of 80° C. and a reaction time of 60 minutes while the contents were stirred. Thus, an isocyanate terminal prepolymer was obtained.

Next, 90.0 parts by weight of the hydroxyl group terminal prepolymer thus obtained and 182.7 parts by weight of the isocyanate terminal prepolymer were continuously injected into a scraped-surface type heat exchange reactor, and then the contents were mixed and stirred under conditions of a reaction temperature of 190° C. and a retention time of 30 minutes.

The resultant viscous product was immediately introduced into the core portion of a concentric, core-sheath type conjugate spinning nozzle (having a nozzle diameter of 0.7 mm) with a spinning pump.

(Sheath Component)

An XPA9048X1 (12-nylon elastomer) manufactured by UBE INDUSTRIES, LTD. as a polyamide-based elastomer was melted with a uniaxial extruder at 225° C., and was then introduced into the sheath portion of the same concentric, core-sheath type conjugate spinning nozzle as that described above.

(Spinning of Conjugated Yarn)

The core component and the sheath component were adjusted with a metering GP so that their weight ratio was 90:10. After that, the components were supplied to a core-sheath type conjugate spinning nozzle adjusted to 225° C., and were then extruded through the nozzle. An oil solution mainly formed of dimethyl silicone was applied to the extruded product, and then a conjugated yarn (8) was wound at a spinning rate of 900 m/min, a drawing ratio of 1.8, and a fineness of 44 dtex. A state of discharge from the nozzle was stable, no end breakage occurred, and hence spinnability was good. In addition, the resultant conjugated yarn (8) had a good degree of symmetry.

Table 1 shows the various physical properties of the resultant conjugated yarn (8).

Example 8-B

A pantyhose knitted fabric (8) was obtained in the same manner as in Example 1-B by using the conjugated yarn (8) obtained in Example 8-A.

The conjugated yarn (8) was extracted from the resultant pantyhose knitted fabric (8), and then its various physical properties were measured. Table 3 shows the results.

In addition, the resultant pantyhose knitted fabric (8) was subjected to wearing evaluations. Table 5 shows the results.

The resultant pantyhose knitted fabric (8) was a knitted fabric having excellent transparency that had never existed before. In addition, the knitted fabric provided an excellent tight feeling irrespective of the fact that the knitted fabric was a thin textile. Further, the knitted fabric had comfortable wearing property because of its ease of wearing and durability.

Comparative Example 1-A

A conjugated yarn (C1) was wound in the same manner as in Example 1-A except that a drawing ratio upon spinning was set to 1.3.

Table 2 shows the various physical properties of the resultant conjugated yarn (C1).

Comparative Example 1-B

A pantyhose knitted fabric (C1) was obtained in the same manner as in Example 1-B by using the conjugated yarn (C1) obtained in Comparative Example 1-A.

The conjugated yarn (C1) was extracted from the resultant pantyhose knitted fabric (C1), and then its various physical properties were measured. Table 4 shows the results.

In addition, the resultant pantyhose knitted fabric (C1) was subjected to wearing evaluations. Table 6 shows the results.

The resultant pantyhose knitted fabric (C1) was a knitted fabric having a remarkably reduced tenacity and poor in each of tight feeling, durability, and ease of wearing in wearing tests.

Comparative Example 2-A

A conjugated yarn (C2) was wound in the same manner as in Example 1-A except that a drawing ratio upon spinning was set to 4.5. End breakage frequently occurred at the time of the winding, and hence spinnability was unstable.

Table 2 shows the various physical properties of the conjugated yarn (C2) collected in a small amount.

Comparative Example 2-B

A pantyhose knitted fabric (C2) was obtained in the same manner as in Example 1-B by using the conjugated yarn (C2) obtained in Comparative Example 2-A.

The conjugated yarn (C2) was extracted from the resultant pantyhose knitted fabric (C2), and then its various physical properties were measured. Table 4 shows the results.

In addition, the resultant pantyhose knitted fabric (C2) was subjected to wearing evaluations. Table 6 shows the results.

The resultant pantyhose knitted fabric (C2) had a high tenacity, and provided a good tight feeling and good durability in wearing tests. However, the knitted fabric was extremely difficult to wear because the knitted fabric elongated to a small extent.

Comparative Example 3-A

A conjugated yarn (C3) was wound in the same manner as in Example 1-A except that a Urethane Pellet (P490) manufactured by Nippon Polyurethane Industry Co., Ltd. was used as a core component.

Table 2 shows the various physical properties of the resultant conjugated yarn (C3).

Comparative Example 3-B

A pantyhose knitted fabric (C3) was obtained in the same manner as in Example 1-B by using the conjugated yarn (C3) obtained in Comparative Example 3-A.

The conjugated yarn (C3) was extracted from the resultant pantyhose knitted fabric (C3), and then its various physical properties were measured. Table 4 shows the results.

In addition, the resultant pantyhose knitted fabric (C3) was subjected to wearing evaluations. Table 6 shows the results.

The resultant pantyhose knitted fabric (C3) was so weak a knitted fabric that a person had to wear the knitted fabric while gently elongating the knitted fabric by degrees. In addition, ripping occurred at several sites mainly including the vicinities of a toe and a heel after the person had finished wearing the knitted fabric. In addition, the knitted fabric provided a poor tight feeling, and in particular, the tight feeling was lost as a result of repeated wearing.

Comparative Example 4-A

A conjugated yarn was wound in the same manner as in Comparative Example 3-A except that a fineness upon spinning was set to 78 dtex. The resultant conjugated yarn was passed through a heating roller adjusted to 80° C. and wound at a drawing ratio of 3.0. Thus, a conjugated yarn (C4) was obtained.

Table 2 shows the various physical properties of the resultant conjugated yarn (C4).

Comparative Example 4-B

A pantyhose knitted fabric (C4) was obtained in the same manner as in Example 1-B by using the conjugated yarn (C4) obtained in Comparative Example 3-A.

The conjugated yarn (C4) was extracted from the resultant pantyhose knitted fabric (C4), and then its various physical properties were measured. Table 4 shows the results.

In addition, the resultant pantyhose knitted fabric (C4) was subjected to wearing evaluations. Table 6 shows the results.

The resultant pantyhose knitted fabric (C4) was difficult to wear because of the following reason. When a person tried to wear the knitted fabric, the knitted fabric hardly elongated, and hence the person had to wear the knitted fabric slowly while elongating the knitted fabric by degrees. In addition, n problem arose after the wearing of the knitted fabric, but its tight feeling was gradually lost and partial ripping occurred.

TABLE 1

| | | Example 1-A | Example 2-A | Example 3-A | Example 4-A | Example 5-A | Example 6-A | Example 7-A | Example 8-A |
|---|---|---|---|---|---|---|---|---|---|
| Configuration | Core | DP method | DP method | DP method | DP method | DP method | DP method | DP method | DP method |
| | Sheath | EL | EL | EL | EL | EL | EL | EL | EL |
| Spinning conditions | Fineness (dtex) | 33 | 44 | 110 | 33 | 33 | 33 | 33 | 44 |
| | Core/Sheath | 90/10 | 80/20 | 90/10 | 60/40 | 90/10 | 90/10 | 90/10 | 90/10 |
| | Drawing ratio | 3.0 | 2.5 | 3.0 | 3.0 | 1.8 | 4.0 | 3.0 | 1.8 |
| Stretching under heat after spinning | 80° C. × 3.0 times | Absent | Absent | Absent | Absent | Absent | Absent | Absent | Absent |
| Physical properties of gray yarn | Fineness (dtex) | 33 | 45 | 110 | 33 | 33 | 33 | 33 | 45 |
| | Tenacity (cN) | 79 | 99 | 165 | 56 | 56 | 95 | 80 | 70 |
| | Strength (cN/dtex) | 2.4 | 2.2 | 1.5 | 1.7 | 1.7 | 2.9 | 2.4 | 1.6 |

TABLE 1-continued

|  | | Example 1-A | Example 2-A | Example 3-A | Example 4-A | Example 5-A | Example 6-A | Example 7-A | Example 8-A |
|---|---|---|---|---|---|---|---|---|---|
| | Elongation percentage (%) | 200 | 264 | 288 | 186 | 397 | 157 | 190 | 190 |
| | 120% tensile stress (cN) | 17 | 15 | 19 | 17 | 11 | 33 | 18 | 14 |
| | 100% tensile residual strain (%) | 10 | 12 | 12 | 12 | 8 | 15 | 11 | 8 |
| | Stress after 100% tensile relaxation | 7.0 | 6.5 | 8.8 | 6.5 | 5.3 | 14.0 | 7.0 | 7.9 |

DP method: Polyurethane obtained by a double-prepolymer method
EL: Elastomer

TABLE 2

|  |  | Comparative Example 1-A | Comparative Example 2-A | Comparative Example 3-A | Comparative Example 4-A |
|---|---|---|---|---|---|
| Configuration | Core | DP method | DP method | PE method | PE method |
|  | Sheath | EL | EL | EL | EL |
| Spinning conditions | Fineness (dtex) | 33 | 33 | 33 | 78 |
|  | Core/Sheath | 90/10 | 90/10 | 90/10 | 90/10 |
|  | Drawing ratio | 1.3 | 4.5 | 3.0 | 3.0 |
| Stretching under heat after spinning | 80° C. × 3.0 times | Absent | Absent | Absent | Present |
| Physical properties of gray yarn | Fineness (dtex) | 33 | 33 | 33 | 25 |
|  | Tenacity (cN) | 40 | 102 | 65 | 55 |
|  | Strength (cN/dtex) | 1.2 | 3.1 | 2.0 | 2.5 |
|  | Elongation percentage (%) | 580 | 93 | 230 | 80 |
|  | 120% tensile stress (cN) | 6 | Unmeasurable | 14 | Unmeasurable |
|  | 100% tensile residual strain (%) | 7 | Unmeasurable | 18 | Unmeasurable |
|  | Stress after 100% tensile relaxation | 4.7 | Unmeasurable | 5.8 | Unmeasurable |

DP method: Polyurethane obtained by a double-prepolymer method
PE method: Polyurethane obtained by a pellet method
EL: Elastomer
Unmeasurable: Unmeasurable owing to an insufficient elongation percentage

TABLE 3

|  |  | Example 1-B | Example 2-B | Example 3-B | Example 4-B | Example 5-B | Example 6-B | Example 7-B | Example 8-B |
|---|---|---|---|---|---|---|---|---|---|
| Physical properties of gray yarn portion extracted from knitted fabric | Fineness (dtex) | 33 | 46 | 113 | 34 | 34 | 33 | 33 | 45 |
|  | Tenacity (cN) | 54 | 65 | 142 | 41 | 44 | 59 | 55 | 59 |
|  | Strength (cN/dtex) | 1.6 | 1.4 | 1.3 | 1.2 | 1.3 | 1.8 | 1.7 | 1.3 |
|  | Elongation percentage (%) | 250 | 327 | 338 | 231 | 420 | 206 | 230 | 308 |
|  | 120% tensile stress (cN) | 8.0 | 7.8 | 9.7 | 6.4 | 6.2 | 17.0 | 8.2 | 13.3 |
|  | 100% tensile residual strain (%) | 11 | 12 | 13 | 12 | 10 | 14 | 12 | 10 |
|  | Stress after 100% tensile relaxation | 5.2 | 5.1 | 6.0 | 4.4 | 4.2 | 9.2 | 5.2 | 5.5 |

TABLE 5

| | | Example 1-B | Example 2-B | Example 3-B | Example 4-B | Example 5-B | Example 6-B | Example 7-B | Example 8-B |
|---|---|---|---|---|---|---|---|---|---|
| Wearing evaluations | Tight feeling | ◎ | ◎ | ◎ | ○ | ○ | ◎ | ◎ | ◎ |
| | Durability (difficulty in ripping) | ○ | ○ | ○ | ○ | ○ | ○ | ○ | ○ |
| | Ease of wearing (elongation feeling and strength) | ◎ | ◎ | ○ | ○ | ◎ | ○ | ◎ | ◎ |
| | Transparency | ◎ | ◎ | ○ | ◎ | ◎ | ◎ | ◎ | ◎ |

TABLE 5

| | | Example 1-B | Example 2-B | Example 3-B | Example 4-B | Example 5-B | Example 6-B | Example 7-B | Example 8-B |
|---|---|---|---|---|---|---|---|---|---|
| Wearing evaluations | Tight feeling | ◎ | ◎ | ◎ | ○ | ○ | ◎ | ◎ | ◎ |
| | Durability (difficulty in ripping) | ○ | ○ | ○ | ○ | ○ | ○ | ○ | ○ |
| | Ease of wearing (elongation feeling and strength) | ◎ | ◎ | ○ | ○ | ◎ | ○ | ◎ | ◎ |
| | Transparency | ◎ | ◎ | ○ | ◎ | ◎ | ◎ | ◎ | ◎ |

TABLE 6

| | | Comparative Example 1-B | Comparative Example 2-B | Comparative Example 3-B | Comparative Example 4-B |
|---|---|---|---|---|---|
| Wearing evaluations | Tight feeling | X | ◎ | △ | △ |
| | Durability (difficulty in ripping) | X | ○ | X | △ |
| | Ease of wearing (elongation feeling and strength) | X | X | X | X |
| | Transparency | ◎ | ◎ | ◎ | ◎ |

Industrial Applicability

The knitted fabric of the present invention is suitably used in a leg knitted fabric product such as a stocking because the knitted fabric uses the core-sheath type conjugated yarn of the present invention which has excellent stretchability, is provided with a sufficient strength, shows high transparency, provides a good tactile sense, and has moderate fit power.

The invention claimed is:

1. A core-sheath type conjugated yarn, comprising:
a core portion containing a polyurethane; and
a sheath portion containing an elastomer,
wherein:
the polyurethane comprises a double-prepolymer type polyurethane obtained by causing a prepolymer having isocyanate groups at both terminals, which is obtained by causing a polyol and a diisocyanate to react with each other, and a prepolymer having hydroxyl groups at both terminals, which is obtained by causing a polyol, a diisocyanate, and a low-molecular weight diol to react with one another, to react with each other; and
the core-sheath type conjugated yarn is obtained by conjugate spinning under conditions of a fineness of 18 to 110 dtex, a weight ratio of the core portion to the sheath portion of 95/5 to 60/40, and a drawing ratio of 1.5 to 4.0.

2. A core-sheath type conjugated yarn according to claim 1, wherein the elastomer comprises at least one kind selected from polyester-based elastomers and polyamide-based elastomers.

3. A knitted fabric, which is knitted by using the core-sheath type conjugated yarn according to claim 1.

4. A knitted fabric according to claim 3, wherein the knitted fabric is used in a leg knitted fabric product.

5. A clothing product, using the knitted fabric according to claim 3.

6. A method of producing a core-sheath type conjugated yarn having a core portion containing a polyurethane and a sheath portion containing an elastomer, the method comprising subjecting a resin containing the polyurethane and a resin containing the elastomer to conjugate spinning,
wherein:
the polyurethane is obtained by causing a prepolymer having isocyanate groups at both terminals, which is obtained by causing a polyol and a diisocyanate to react with each other, and a prepolymer having hydroxyl groups at both terminals, which is obtained by causing a polyol, a diisocyanate, and a low-molecular weight diol to react with one another, to react with each other; and
the conjugate spinning is performed under conditions of a fineness of 18 to 110 dtex, a weight ratio of the core portion to the sheath portion of 95/5 to 60/40, and a drawing ratio of 1.5 to 4.0.

7. A method of producing a core-sheath type conjugated yarn according to claim 6, wherein the elastomer comprises at least one kind selected from polyester-based elastomers and polyamide-based elastomers.

* * * * *